United States Patent

Walter et al.

(10) Patent No.: US 9,914,353 B2
(45) Date of Patent: Mar. 13, 2018

(54) FUEL TANK CHECK VALVE

(71) Applicant: EATON CORPORATION, Cleveland, OH (US)

(72) Inventors: Stefan Walter, Stutensee (DE); Jeffrey Smith, Rochester Hills, MI (US); Steven Ambrose, Farmington Hills, MI (US); Mustafa Huseyin, Karlsruhe (DE); Raymond Bruce McLauchlan, Macomb, MI (US)

(73) Assignee: Eaton Corporation, Cleveland, OH (US)

( * ) Notice: Subject to any disclaimer, the term of this patent is extended or adjusted under 35 U.S.C. 154(b) by 159 days.

(21) Appl. No.: 14/580,929

(22) Filed: Dec. 23, 2014

(65) Prior Publication Data
US 2016/0176285 A1    Jun. 23, 2016

Related U.S. Application Data

(63) Continuation of application No. PCT/US2014/049737, filed on Aug. 5, 2014.
(Continued)

(51) Int. Cl.
*B60K 15/035* (2006.01)
*F16K 11/06* (2006.01)
(Continued)

(52) U.S. Cl.
CPC ...... *B60K 15/03519* (2013.01); *B60K 15/035* (2013.01); *F16K 11/06* (2013.01);
(Continued)

(58) Field of Classification Search
CPC .......... F16K 15/04; F16K 31/06; F16K 35/16; Y10T 137/87917; Y10T 137/88022; Y10T 137/8803; Y10T 137/88038; Y10T 137/88046; Y10T 137/88054; Y10T 137/7869; Y10T 137/7871; Y10T 137/7873; Y10T 137/7785;
(Continued)

(56) References Cited

U.S. PATENT DOCUMENTS 1,372,915 A * 3/1921 Smith ...................... B25D 9/14
                                                      137/115.03
1,889,122 A * 11/1932 Hewitt .................... F16K 15/04
                                                       137/512.3
(Continued)

FOREIGN PATENT DOCUMENTS

JP    08014115    1/1996

OTHER PUBLICATIONS

International Search Report for International Application No. PCT/US2014/049737 dated Nov. 18, 2014.

*Primary Examiner* — William McCalister
(74) *Attorney, Agent, or Firm* — RMCK Law Group PLC

(57) ABSTRACT

A valve configured for use with a fuel tank can have a floating main valve housed within a valve body. The valve body can define a first port fluidly connected to the fuel tank, a second port fluidly connected to a tank venting system of the fuel tank and a third port fluidly connected to the filler neck. The solenoid can be configured on the check valve. The solenoid can have a pin configured to extend into the valve body and engage the floating main valve in a locked position.

14 Claims, 14 Drawing Sheets

Related U.S. Application Data

(60) Provisional application No. 61/862,501, filed on Aug. 5, 2013, provisional application No. 61/873,145, filed on Sep. 3, 2013, provisional application No. 61/878,903, filed on Sep. 17, 2013.

(51) Int. Cl.
  *F16K 15/04* (2006.01)
  *F16K 31/06* (2006.01)
  *F16K 35/16* (2006.01)
  *F16K 37/00* (2006.01)

(52) U.S. Cl.
  CPC .............. *F16K 15/04* (2013.01); *F16K 31/06* (2013.01); *F16K 35/16* (2013.01); *F16K 37/0025* (2013.01); *B60K 2015/03576* (2013.01); *B60K 2015/03585* (2013.01)

(58) Field of Classification Search
  CPC ............ B60K 15/03519; B60K 15/035; B60K 2015/03576; B60K 2015/03585
  USPC .... 137/613, 614.16, 614.17, 614.18, 614.19, 137/614.2, 517, 519, 519.5, 498; 251/129.15–129.22
  See application file for complete search history.

(56) References Cited

U.S. PATENT DOCUMENTS

| | | | | |
|---|---|---|---|---|
| 2,392,741 | A * | 1/1946 | Hurlburt | F16K 31/408 137/614.16 |
| 2,500,156 | A * | 3/1950 | Dechant | F16K 15/18 137/512.3 |
| 2,563,244 | A * | 8/1951 | Holicer | F16K 1/306 137/317 |
| 2,632,462 | A * | 3/1953 | Selwyn | F16K 15/06 137/322 |
| 2,668,555 | A * | 2/1954 | Bartolat | F16K 17/30 137/498 |
| 3,024,807 | A * | 3/1962 | Tamplen | F16K 31/38 137/517 |
| 3,854,497 | A * | 12/1974 | Rosenberg | F16K 5/10 137/269.5 |
| 3,963,049 | A * | 6/1976 | Beauregard | F16K 25/00 137/614.18 |
| 4,004,533 | A * | 1/1977 | Woolston | B63G 8/22 114/333 |
| 4,109,675 | A * | 8/1978 | Acar | F16K 17/0426 137/494 |
| 4,275,823 | A * | 6/1981 | Credle, Jr. | B67D 1/0462 137/113 |
| 4,318,383 | A * | 3/1982 | Iritani | F02M 25/0836 123/520 |
| 4,354,523 | A * | 10/1982 | Hochmuth | F16L 29/007 137/322 |
| 4,457,328 | A * | 7/1984 | Lins | F16K 13/04 137/614.13 |
| 4,479,506 | A * | 10/1984 | Goans | F16K 17/00 137/498 |
| 4,791,956 | A * | 12/1988 | Kominami | F16K 17/34 137/503 |
| 5,174,332 | A * | 12/1992 | Yokoyama | F16K 17/30 137/517 |
| 5,549,135 | A * | 8/1996 | Kawahara | F16K 1/14 137/513.3 |
| 5,613,518 | A * | 3/1997 | Rakieski | F16K 17/30 137/513.5 |
| 5,755,259 | A * | 5/1998 | Schulze | F16K 17/30 137/460 |
| 5,906,186 | A * | 5/1999 | Aoyama | F01L 1/143 123/432 |
| 5,906,189 | A | 5/1999 | Mukai | |
| 6,003,550 | A * | 12/1999 | Saarem | F16K 5/0407 137/460 |
| 6,047,718 | A * | 4/2000 | Konsky | F16K 1/443 137/1 |
| 6,526,951 | B2 * | 3/2003 | Ishigaki | B60K 15/03504 123/519 |
| 7,694,692 | B2 * | 4/2010 | Hansson | F16K 1/36 137/614.17 |
| 2002/0023688 | A1 | 2/2002 | Enge | |
| 2004/0074542 | A1 * | 4/2004 | Flauzac | F16K 5/0605 137/614.17 |
| 2005/0022872 | A1 * | 2/2005 | Robison | F16K 5/0407 137/460 |
| 2005/0166979 | A1 * | 8/2005 | Berger | F16K 1/443 137/630.15 |
| 2011/0284125 | A1 | 11/2011 | Hagen | |

* cited by examiner

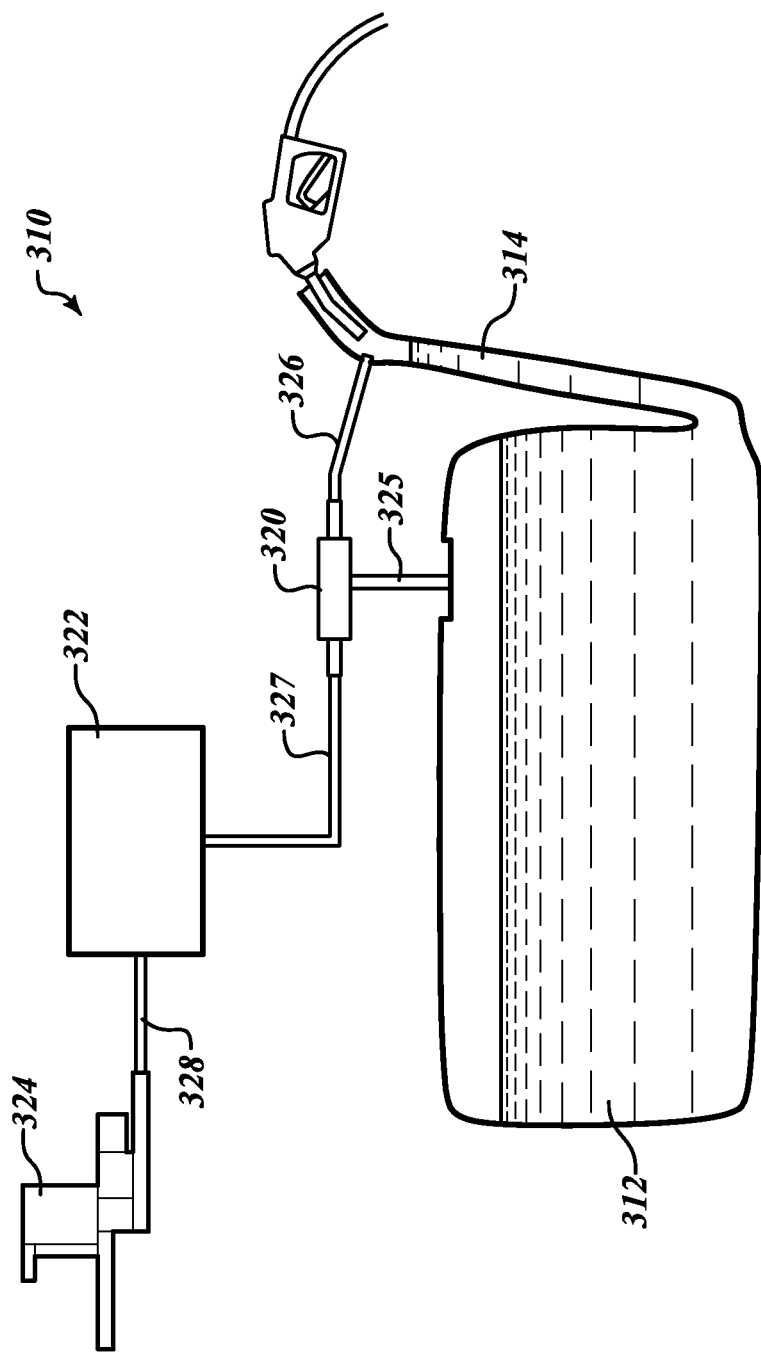

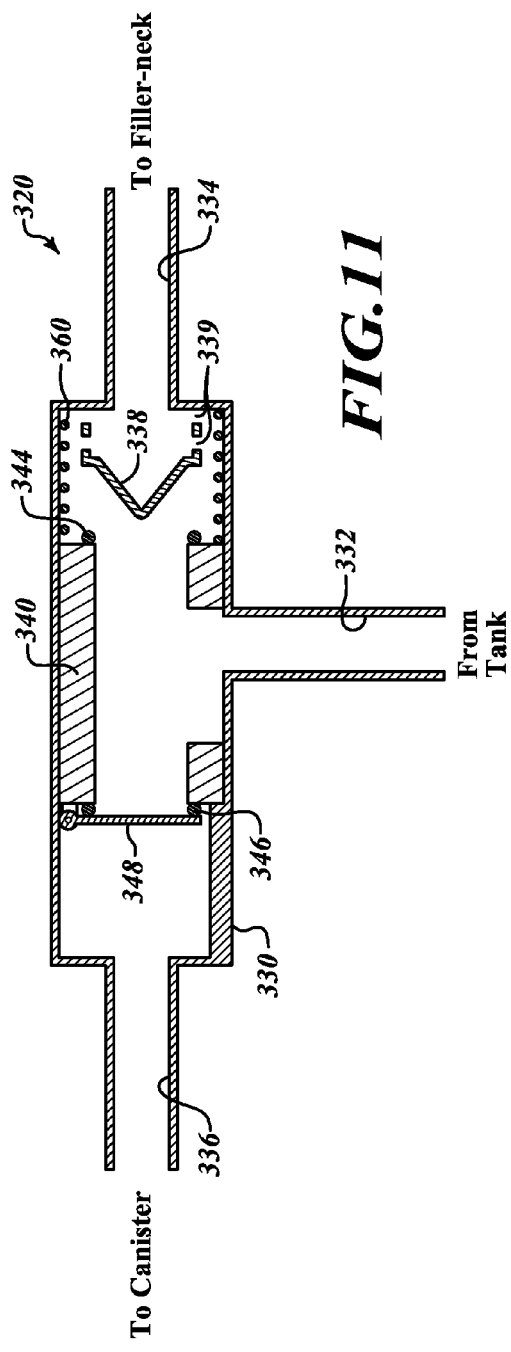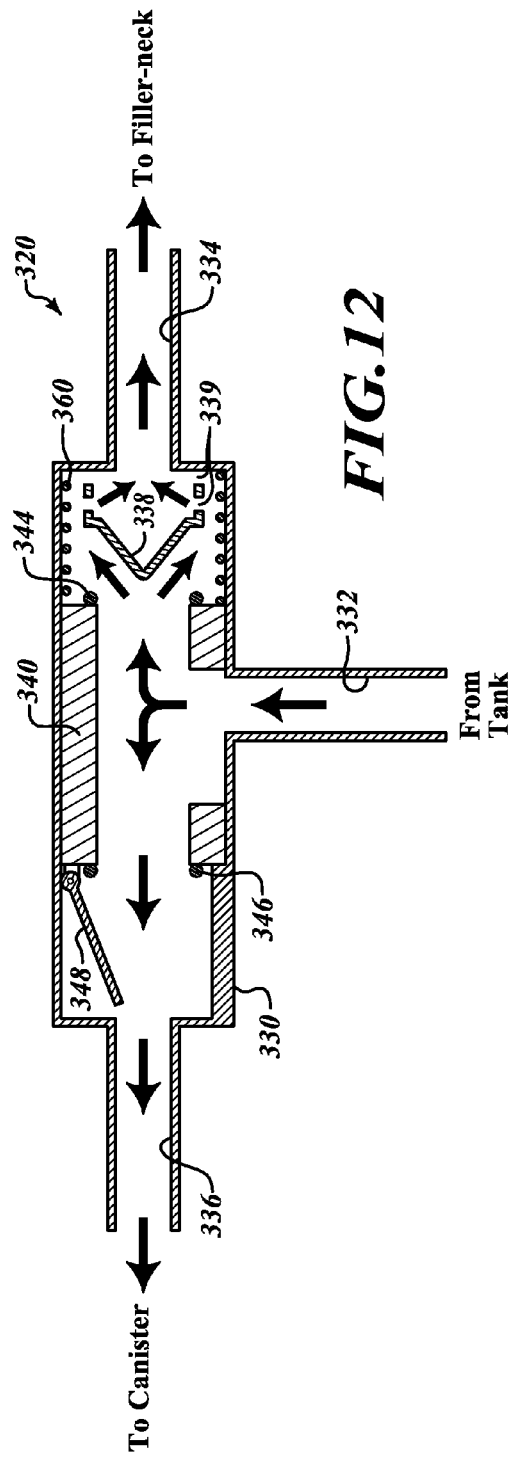

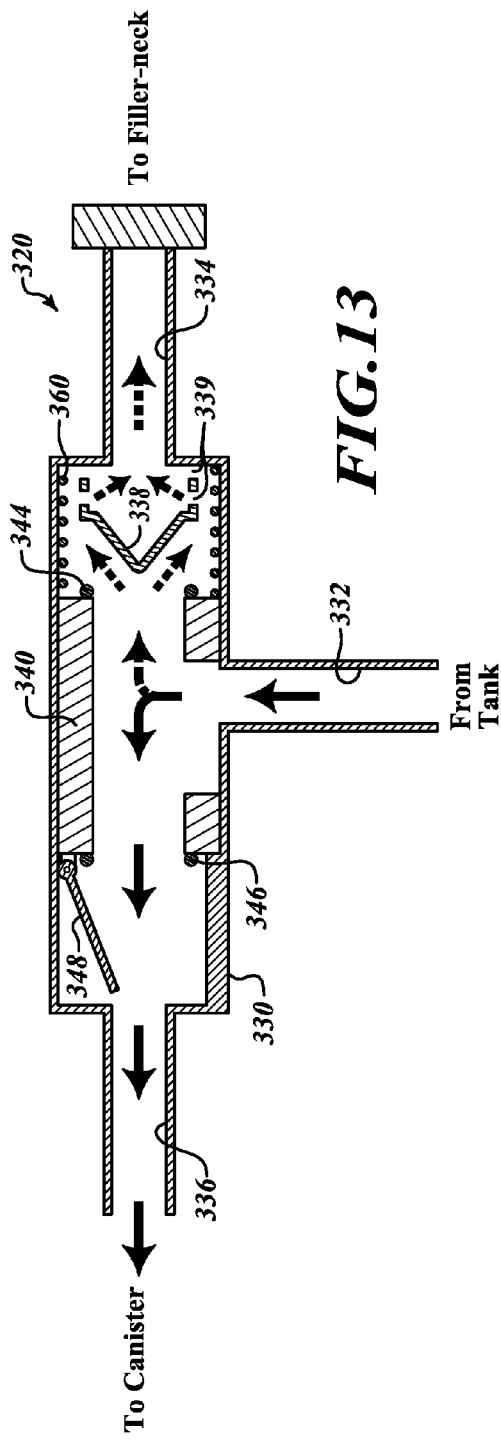
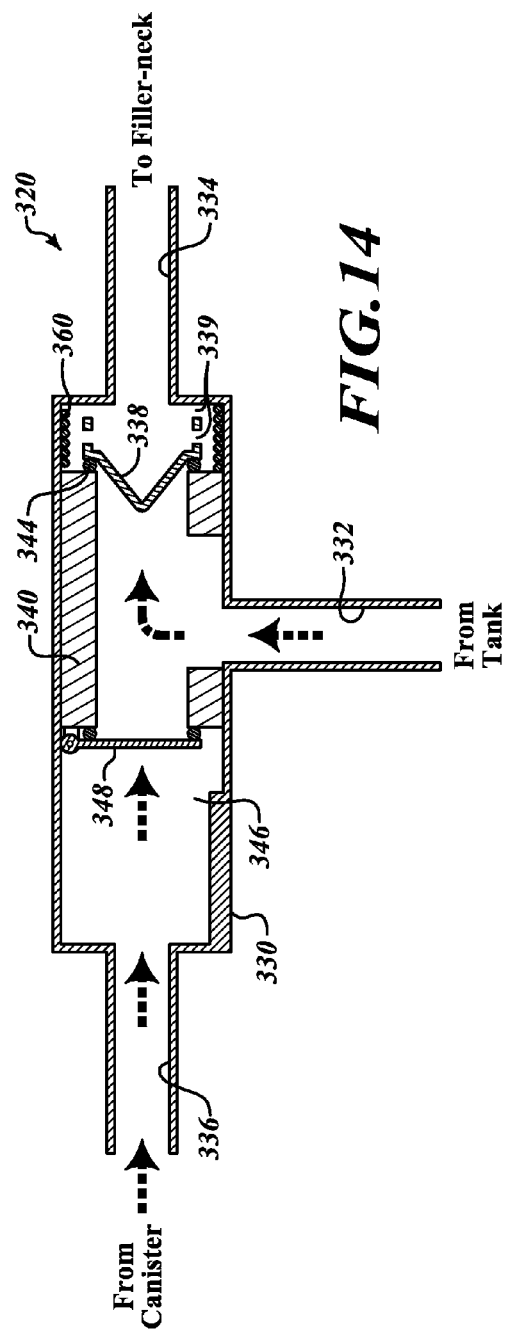
FIG.13
FIG.14

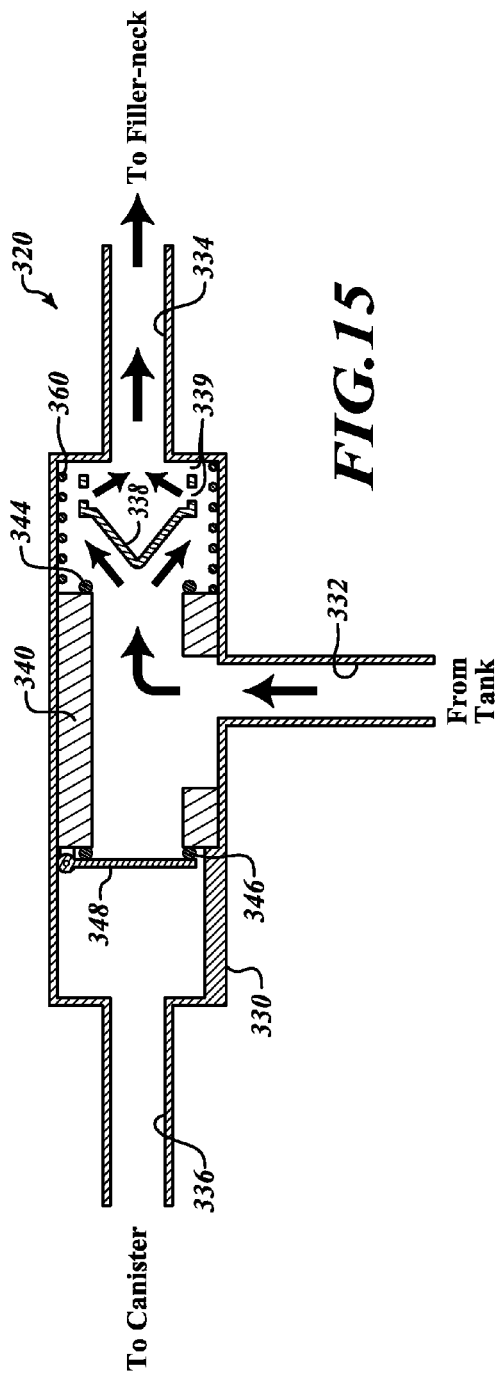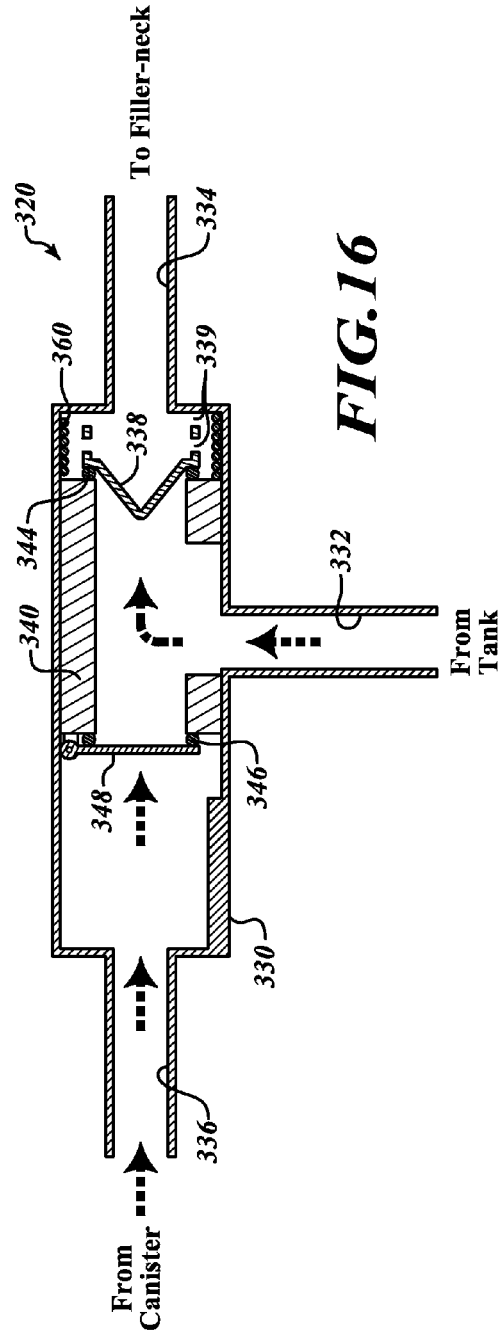

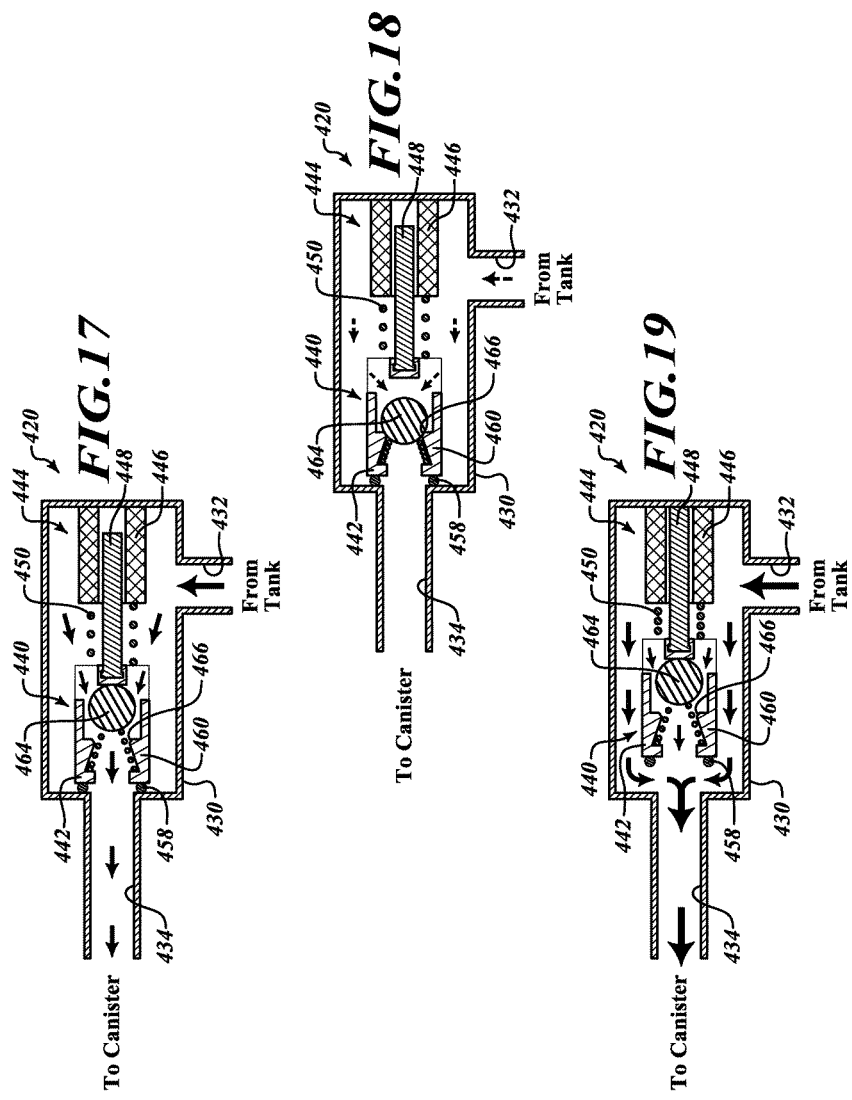

FUEL TANK CHECK VALVE

CROSS-REFERENCE TO RELATED APPLICATIONS

This application is a continuation of International Patent Application No. PCT/US2014/049737 filed on Aug. 5, 2014, which claims the benefit of U.S. Patent Application No. 61/862,501 filed on Aug. 5, 2013, U.S. Patent Application No. 61/873,145 filed on Sep. 3, 2013 and U.S. Patent Application No. 61/878,903 filed on Sep. 17, 2013. The disclosures of the above applications are incorporated herein by reference.

FIELD

The present disclosure relates generally to fuel tanks on passenger vehicles and more particularly to a three way check valve configured between a fuel tank, a canister and a filler neck.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A valve configured for use with a fuel tank system having a fuel tank and a filler neck includes a check valve and a solenoid. The check valve can be disposed on the fuel tank and have a floating main valve housed within the valve body. The valve body can define a first port fluidly connected to the fuel tank. A second port can be fluidly connected to a tank venting system of the fuel tank. A third port can be fluidly connected to the filler neck. The solenoid can be configured on the check valve and have a pin configured to slidably extend into the valve body and engage the floating main valve in a locked position.

According to additional features the floating main valve can further comprise a notch configured to receive the pin in the locked position. The check valve can further comprise a baffle configured within the valve body. The baffle can have openings defined therein. The openings can provide a flow path between the second port and the third port. The baffle can be angled outwardly toward an inner surface of the valve body. The check valve can further comprise a biasing member disposed within the valve body. The biasing member can bias the floating main valve toward a normally open position permitting flow from the second port to the third port.

In other features, the check valve can further comprise a first o-ring disposed on the floating main valve and configured to slidably communicate on the valve body. The check valve can further comprise a second o-ring disposed on the floating main valve and configured to engage the baffle in a closed position. The floating main valve can be configured to block flow from the first and second ports from communicating with the third port in a closed position. In the closed position, a difference of pressure in the fuel tank and a pressure at the third port is greater than a closing pressure. In the closed position, the first pin can be blocked by the floating main valve and precluded from actuating. Energizing the first solenoid for actuation while the floating main valve is in the closed position will generate an error signal.

A valve configured for use with a fuel tank system having a fuel tank and a filler neck can include a check valve, a bypass duct, a first solenoid and a second solenoid. The check valve can be disposed on the fuel tank and have a floating main valve housed within a valve body. The valve body can define a first port fluidly connected to the fuel tank, a second port fluidly connected to a tank venting system of the fuel tank, and a third port fluidly connected to the filler neck. The bypass duct can fluidly couple the first port and the third port. The first solenoid can be configured on the check valve and have a first pin configured to slidably extend into the valve body and engage the floating main valve in a locked position. The second solenoid can be configured on the check valve and have a second pin including a damper configured at a distal end. The second solenoid can be configured to energize between a first position wherein the damper inhibits fluid communication through the bypass duct and a second position wherein the damper permits fluid communication through the bypass duct.

According to other features, the valve body can define a first passage and a second passage. The first passage can permit fluid communication from the first port to the bypass duct. The second passage can permit fluid communication from the bypass duct to the third port. A membrane can be disposed in the valve body adjacent to the first port. The membrane can be configured to allow at least one of air and vapor through and inhibits liquid from passing through. The floating main valve can further comprise a notch configured to receive the first pin in the locked position.

In additional features, the check valve can further comprise a baffle configured within the valve body. The baffle can have openings defined therein. The openings can provide a flow path between the second port and the third port. The baffle can be angled outwardly toward an inner surface of the valve body. The check valve can further comprise a biasing member disposed within the valve body. The biasing member can bias the floating main valve toward a normally open position permitting flow from the second port to the third port. The floating main valve can be configured to block flow from the first and second port from communicating with the third port in a closed position. In the closed position, a difference of pressure in the fuel tank and a pressure at the third port can be greater than a closing pressure. In the closed position, the first pin can be blocked by the floating main valve and precluded from actuating. Energizing the first solenoid for actuation while the floating main valve is in the closed position will generate an error signal.

A valve configured for use in a fuel tank system having a fuel tank and a canister according to one example includes a check valve, a ball check valve and a solenoid assembly. The check valve can have a main valve body that defines a first port and a second port. The first port can be fluidly connected to the fuel tank and the second port can be fluidly connected to the canister. The check valve can selectively operate in each of (i) a tank venting condition, (ii) a sealed condition and (iii) a refueling condition. The ball check valve can be movably disposed in the main valve body. The ball check valve can have a check ball valve body and a check ball. The check ball can move between a seated position that inhibits flow through the ball check valve and an unseated position that permits flow through the check ball valve body. The solenoid assembly can move between (i) an energized position that moves the check ball valve body off the main valve body permitting flow from the fuel tank to the canister in the refueling condition and (ii) a de-energized position that permits the check ball valve body to form a seal with the main valve body to inhibit flow around the check ball valve body to the second port in both of the tank venting condition and the sealed condition.

According to additional features, in the tank venting condition, the check ball can move to the unseated position permitting flow through the check ball valve body. The check valve further comprises a biasing member that biases the check ball valve body toward the check ball valve body to form a seal with the main valve body to inhibit flow around the check ball valve body to the second port.

A fuel tank system constructed in accordance to one example of the present disclosure can include a fuel tank, a check valve and a solenoid. The fuel tank can have a filler neck. The check valve can be disposed on the fuel tank and have a floating main valve housed within a valve body. The valve body can define a first port fluidly connected to the fuel tank, a second port fluidly connected to a tank venting system of the fuel tank and a third port fluidly connected to the filler neck. The solenoid can be configured on the check valve. The solenoid can have a pin configured to extend into the valve body and engage the floating main valve in a locked position.

According to additional features, the floating main valve can further comprise a notch configured to receive the pin in the locked position. The check valve can further comprise a baffle that is configured within the valve body. The baffle can have openings defined therein. The openings can provide a flow path between the second port and the third port. The baffle can be angled outwardly toward an inner surface of the valve body.

According to still other features, the check valve can further comprise a biasing member disposed within the valve body. The biasing member can bias the floating main valve toward a normally open position permitting flow from the second port to the third port. The check valve can further comprise a first o-ring disposed on the floating main valve. The first o-ring can be configured to slidably communicate on the valve body. The check valve can further comprise a second o-ring disposed on the floating main valve. The second o-ring can be configured to engage the baffle in a closed position.

According to other features, the floating main valve is configured to block flow from the first and second ports from communicating with the third port in a closed position. In the closed position, a difference of pressure in the fuel tank and a pressure at the third port is greater than a closing pressure. In the closed position, the pin can be blocked by the floating main valve and precluded from actuating. Energizing the solenoid for actuation while the floating main valve is in the closed position will generate an error signal.

According to other configurations, the fuel tank system further comprises a canister fluidly connected to the filler neck. A fuel tank isolation valve can be fluidly connected to the canister.

A fuel tank system constructed in accordance to another example of the present disclosure can include a fuel tank, a check valve, a bypass duct, a first solenoid and a second solenoid. The fuel tank can have a filler neck. The check valve can be disposed on the fuel tank and have a floating main valve housed within a valve body. The valve body can define a first port fluidly connected to the fuel tank, a second port fluidly connected to a tank venting system of the fuel tank and a third port fluidly connected to the filler neck. The first solenoid can be configured on the check valve. The first solenoid can have a first pin configured to extend into the valve body and engage the floating main valve in a locked position. The second solenoid can be configured on the check valve and have a second pin including a damper configured at a distal end. The second solenoid can be configured to energize between a first position wherein the damper inhibits fluid communication through the bypass duct and a second position wherein the damper permits fluid communication through the bypass duct.

According to additional features, the valve body can define a first passage and a second passage. The first passage can permit fluid communication from the first port to the bypass duct. The second passage can permit fluid communication from the bypass duct to the third port.

According to other features, a membrane can be disposed in the valve body adjacent to the first port. The membrane can be configured to allow at least one of air and vapor through and inhibit liquid from passing through.

BRIEF DESCRIPTION OF THE DRAWINGS

The present disclosure will become more fully understood from the detailed description and the accompanying drawings, wherein:

FIG. 11 is a cross-sectional view of the three way check valve of FIG. 10;

FIG. 12 is a cross-sectional view of the three way check valve of FIG. 10 and shown in a first condition with airflow going either to the filler neck and/or will open the check-valve to enter the canister when the tank is pressurized and the canister and/or filler-neck size is not pressurized or features a lower pressure;

FIG. 13 is a cross-sectional view of the three way valve of FIG. 10 and shown in a second condition when the fuel tank is pressurized, the canister side of the valve is at a lower temperature and the filler-neck side of the valve is blocked/closed, the airflow out of the tank will open the check-valve and flow to the canister;

FIG. 14 is a cross-sectional view of the three way valve of FIG. 10 and shown in a third condition during a first filler neck malfunction;

FIG. 15 is a cross-sectional view of the three way valve of FIG. 10 and shown in a third condition during a second filler neck malfunction;

FIG. 16 is a cross-sectional view of the three way valve of FIG. 10 and shown in a third condition during a third filler neck malfunction;

FIG. 17 is a cross-sectional view of a check-valve constructed in a accordance to additional features and shown in a normal vent position with the valve de-energized;

FIG. 18 is a cross-sectional view of the check-valve of FIG. 17 and shown in a shut-off position with the valve de-energized; and FIG. 19 is a cross-sectional view of the check-valve of FIG. 17 and shown in a refueling position with the valve energized.

DETAILED DESCRIPTION

Figure 1:
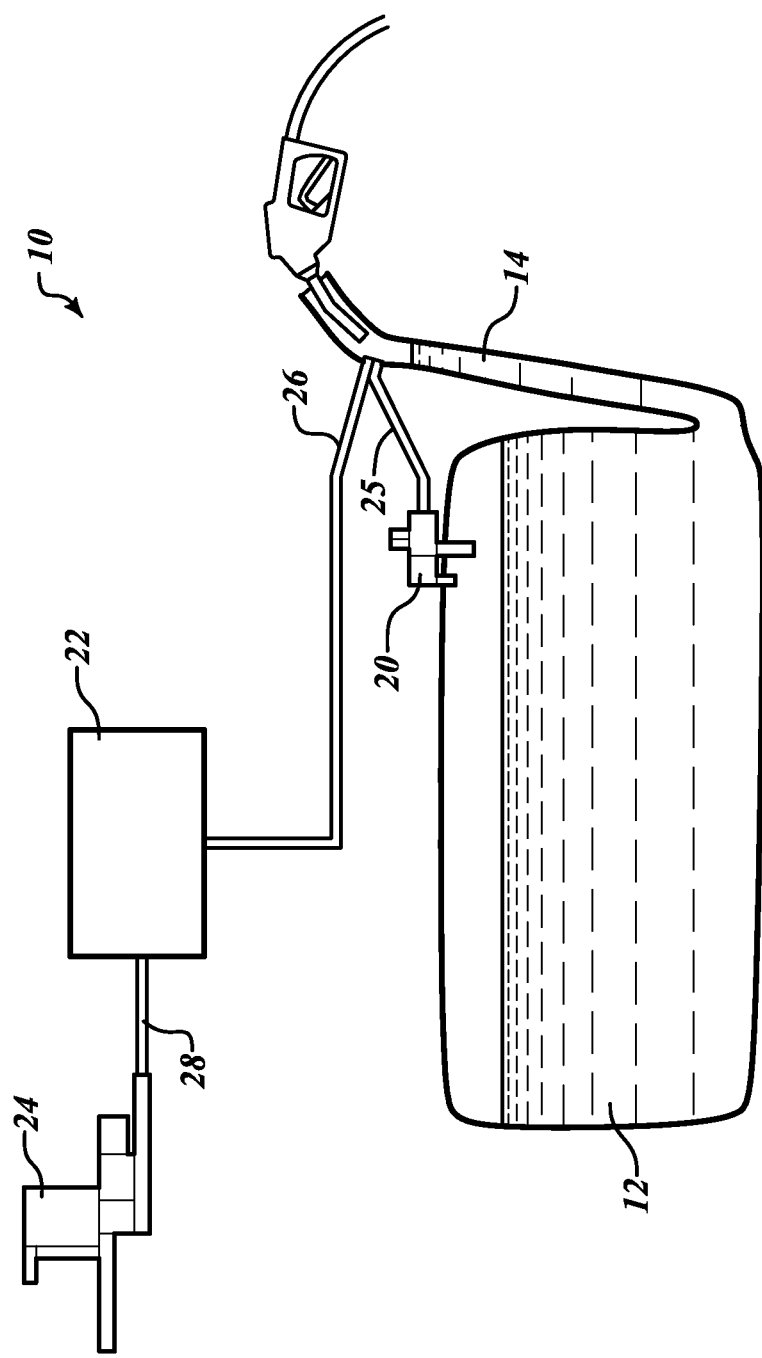
FIG. 1 is a schematic illustration of a fuel tank system having a check valve constructed in accordance to one example of the present disclosure.

With initial reference to FIG. 1, a fuel tank system constructed in accordance to one example of the present disclosure is shown and generally identified at reference number 10. The fuel tank system 10 can generally include a fuel tank 12, a filler neck 14, a check valve 20, a canister 22 and a fuel tank isolation valve (FTIV) 24. A first vapor line 25 is connected between the filler neck 14 and the check valve 20. A second vapor line 26 is connected between the filler neck 14 and the canister 22. A third vapor line 28 is connected between the canister 22 and the FTIV 24.

Figure 2:
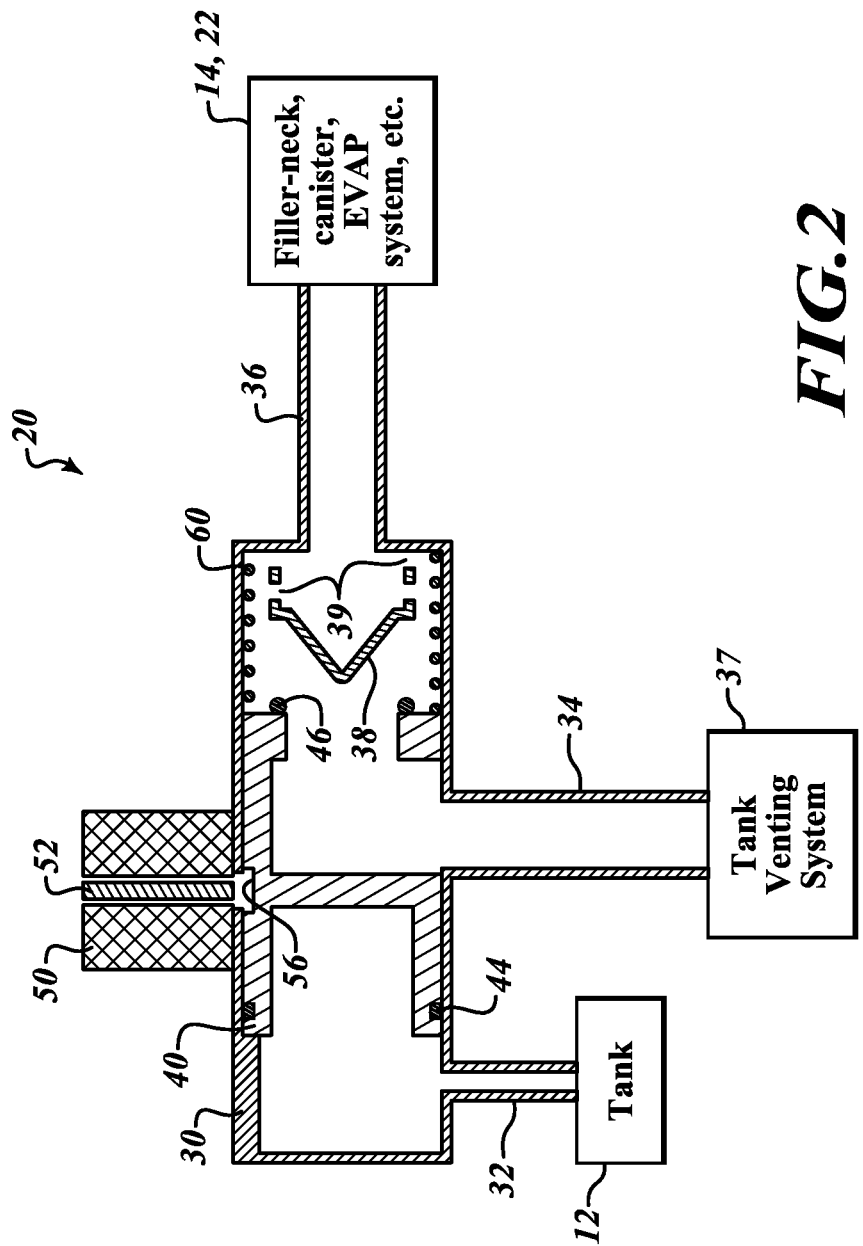
FIG. 2 is a cross-sectional view of the check valve of FIG. 1.
Figure 3:
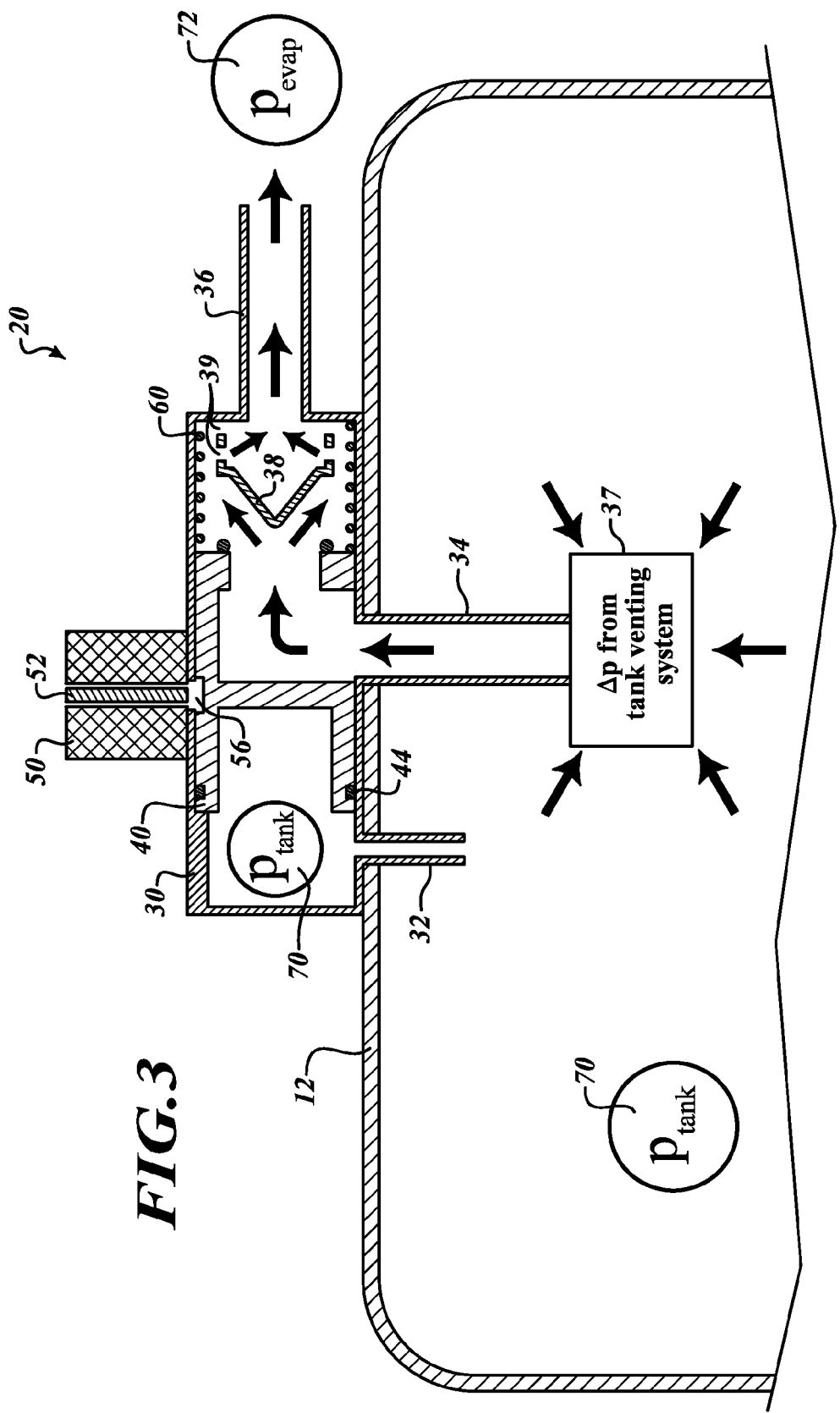
FIG. 3 is a cross-sectional view of the check valve of FIG. 1 and shown in a first condition with the check valve normally open.
Figure 4:
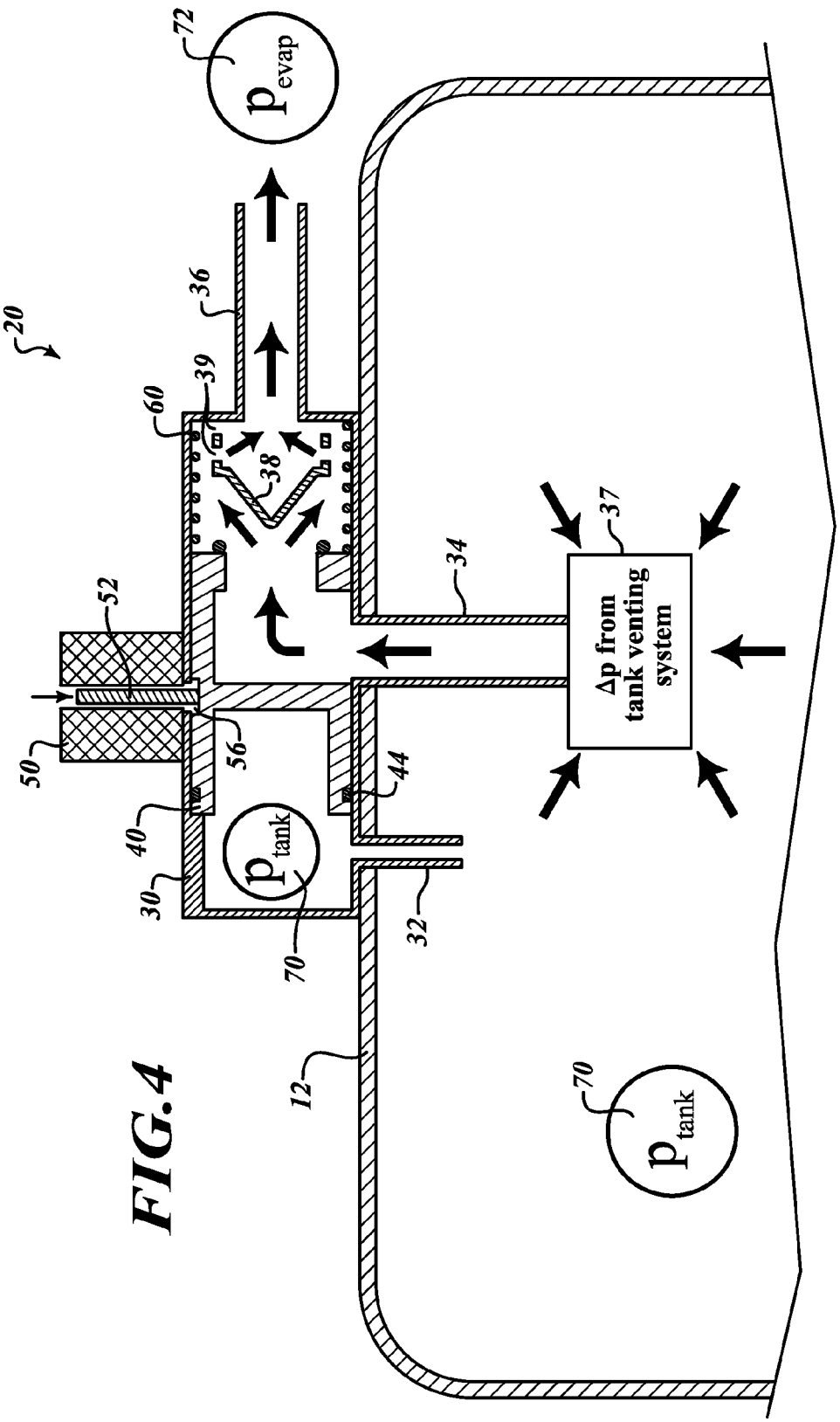
FIG. 4 is a cross-sectional view of the check valve of FIG. 1 and shown in a second condition with the check valve energized in a locked condition.

Turning now to FIGS. 2-4, the check valve 20 will be described in greater detail. The check valve 20 can generally include a valve body 30 that defines a first port 32, a second port 34 and a third port 36. The first port 32 fluidly connects the check valve 20 to the fuel tank 12. The second port 34 is fluidly connected to a fuel tank venting system 37. The third port 36 is fluidly connected to the filler neck 14, the canister 22 and ultimately the FTIV 24. An internal baffle 38 can be configured in the valve body 30. The internal baffle 38 can define openings 39. In the example shown, the internal baffle 38 has a generally angled profile that urges flow toward an internal diameter of the valve body 30.

The check valve 20 has a shuttle or floating main valve 40 that is configured to slidably traverse within the valve body 30 in a direction left and right as viewed in FIGS. 2 and 3.

Figure 6:
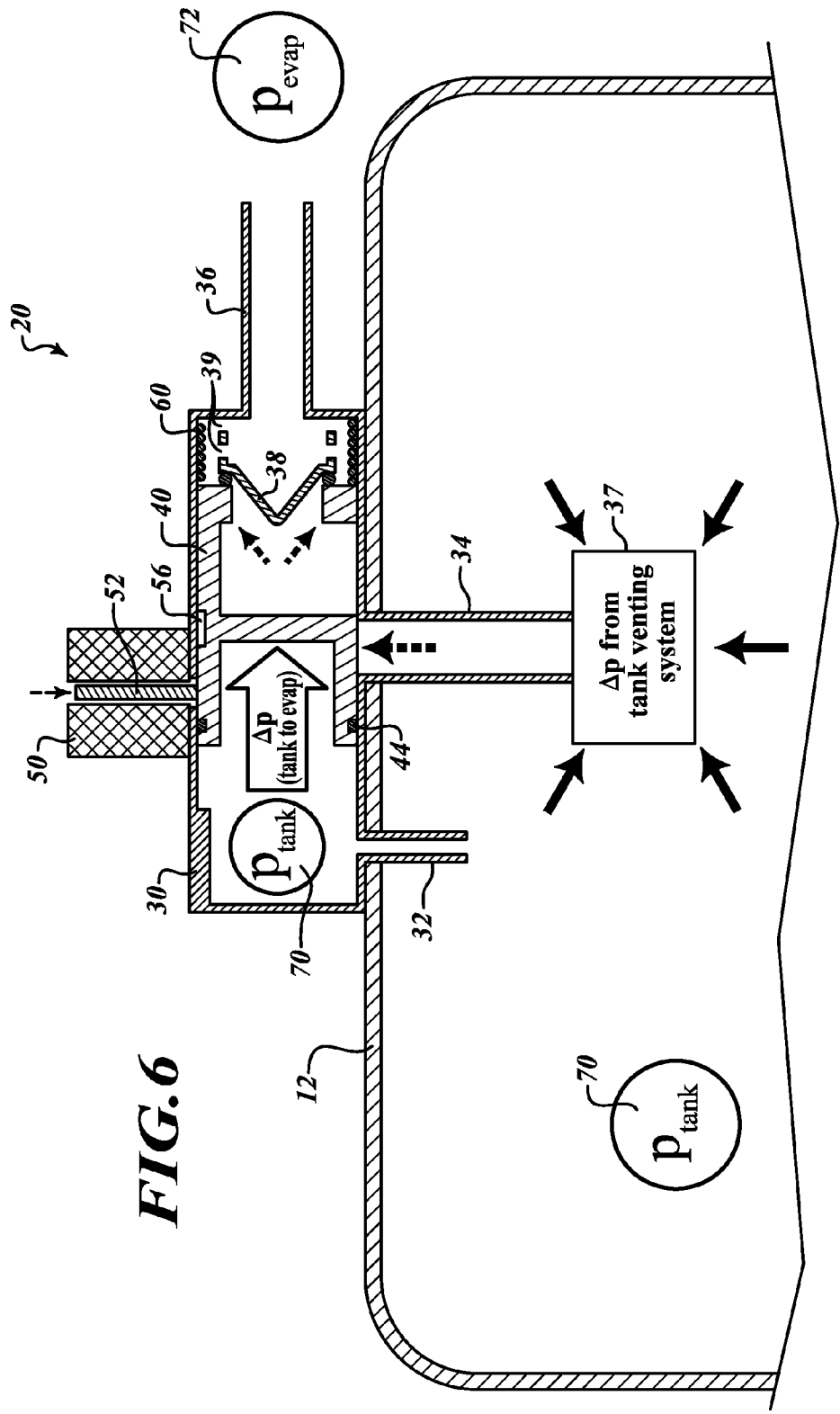
FIG. 6 is a cross-sectional view of the check valve of FIG. 1 and shown in a fourth condition with the check valve in a mechanically closed position and with the solenoid being energized resulting in an error signal.

A first sealing member such as a first o-ring 44 is nestingly received in a groove defined on the floating main valve 40. A second sealing member such as a second o-ring 46 is disposed on an end face of the floating main valve 40. The second o-ring 46 is configured to selectively engage the baffle 38 when the check valve 20 is in a mechanically closed position (FIG. 6). The geometry of the floating main valve 40 is merely exemplary and other configurations are contemplated.

A solenoid 50 can be disposed on the valve body 30. The solenoid 50 can have a pin 52 that actuates through a passage configured on the valve body 30 to engage a notch 56 on the floating main valve 40. The pin 52 can actuate as a result of energizing coils within the solenoid 50. A biasing member 60 can be disposed in the valve body 30 and configured to bias the valve body 30 in a direction leftward as viewed in FIGS. 3 and 4.

With continued reference to FIG. 3, operation of the check valve 20 in a first condition will be described. In the first condition, the check valve 20 is in a normally open position. Explained further, when the difference between a tank pressure, $p_{tank}$ 70 and a pressure of the evaporative system outside of the tank, $p_{evap}$ 72 is lower than a closing pressure, the check valve 20 vents from the second port 34 to the third port 36. In one example, the closing pressure can be 25 mbar. Other closing pressures are contemplated. The biasing member 60 ensures that the floating main valve 40 is biased toward an open position as shown in FIG. 3. A pressure drop from $p_{tank}$ 70 to $p_{evap}$ 72 is given by the tank venting system 37 and the pressure drop of the check valve 20 from the second port 34 to the third port 36. As shown, the $p_{tank}$ 70 within the valve body 30 leftward of the floating valve 40 is equivalent to the $p_{tank}$ 70 in the fuel tank 12.

With reference now to FIG. 4, operation of the check valve 20 in a second condition will be described. In the second condition, the check valve 20 is in a locked condition where the solenoid 50 is energized. When the solenoid 50 is energized while the pressure between the $p_{tank}$ 70 and the $p_{evap}$ 72 is less than the closing pressure, the pin 52 extends into the notch 56 of the floating main valve 40. When the pin 52 extends into the notch 56, the floating main valve 40 is precluded from moving horizontally as viewed in FIG. 4 and therefore, locked. Once the main valve 40 is in a locked position, the pressure difference from $p_{tank}$ 70 to $p_{evap}$ 72 will not have any effect on the mechanical functions of the check valve 20. The second condition can be used for refueling, depressurizing the fuel tank 12 and other events where a high flow through the check valve 20 is required.

Figure 5:
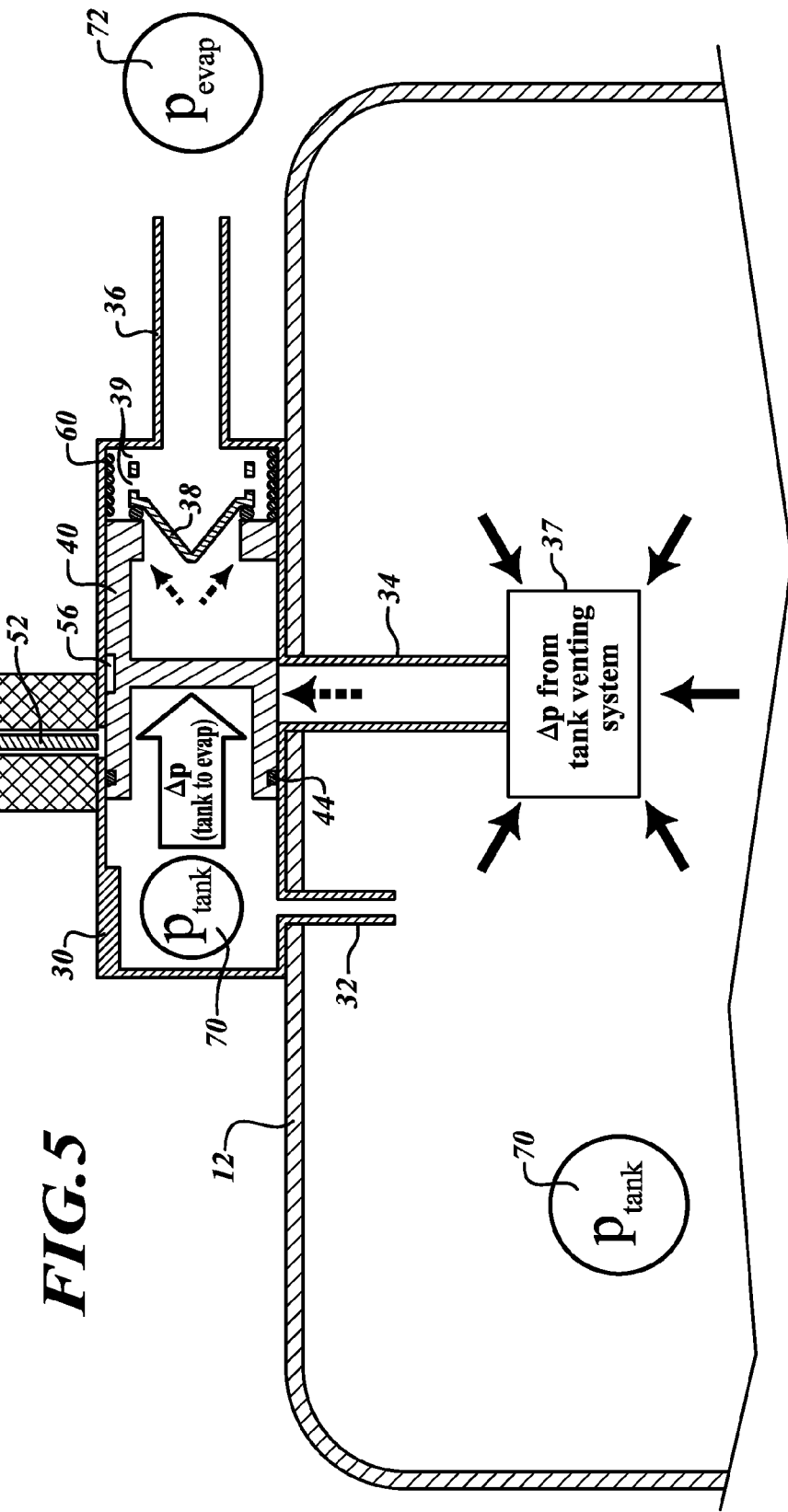
FIG. 5 is a cross-sectional view of the check valve of FIG. 1 and shown in a third condition with the check valve in a mechanically closed position.

Turning now to FIG. 5, operation of the check valve 20 in a third condition with the check valve 20 in a mechanically closed position will be described. When the solenoid 50 is not energized, the check valve 20 will close when the difference of $p_{tank}$ 70 to $p_{evap}$ 72 is higher than the closing pressure. This differential pressure will result in a force acting on the floating main valve 40 against the spring force and urging the floating main valve 40 rightward (as viewed in FIG. 5) until the check valve 20 is closed. In this third condition, the flow path from the fuel tank 12 to the evaporative system outside of the fuel tank is fully closed.

With reference now to FIG. 6, the check valve 20 is shown in a fourth condition with the check valve 20 in a mechanically closed position and with the solenoid 50 being energized resulting in an error signal. When the check valve 20 is in the third condition (see FIG. 5), and the solenoid 50 is energized, the pin 52 of the solenoid 50 is precluded from actuating because it is blocked by the floating main valve 40.

The inability of the pin 52 from actuating will result in an error signal being transmitted to a control unit (not shown) of the vehicle.

Figure 7:
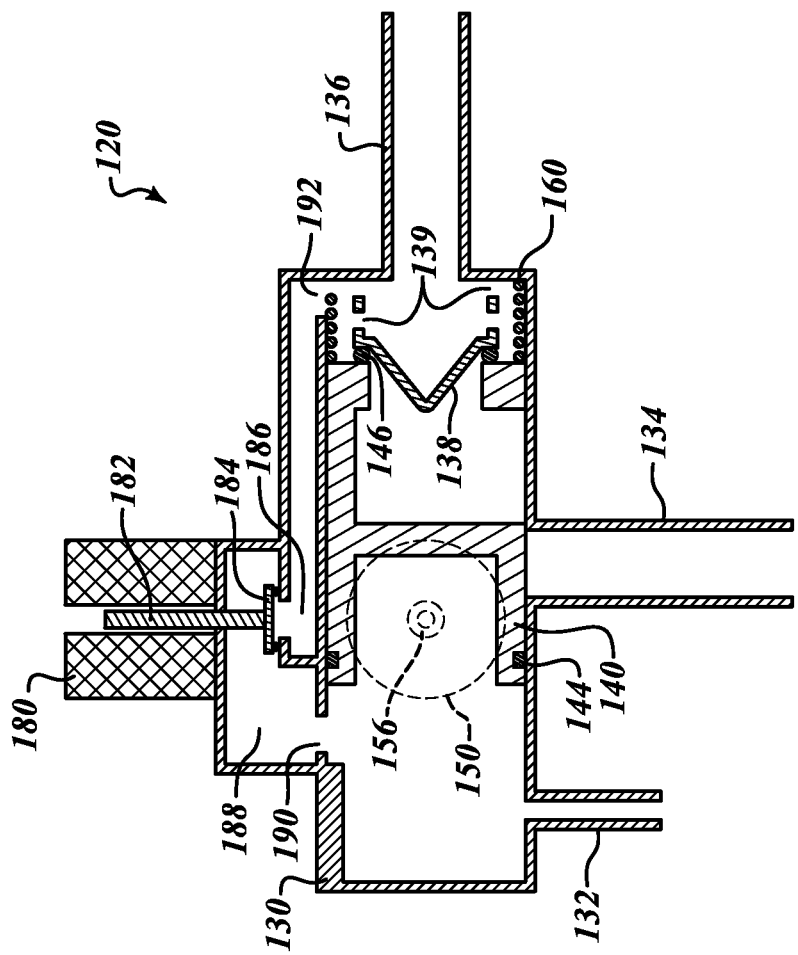
FIG. 7 is a cross-sectional view of a check valve constructed in accordance to additional features of the present disclosure and having a second solenoid shown in a normally closed position.
Figure 8:
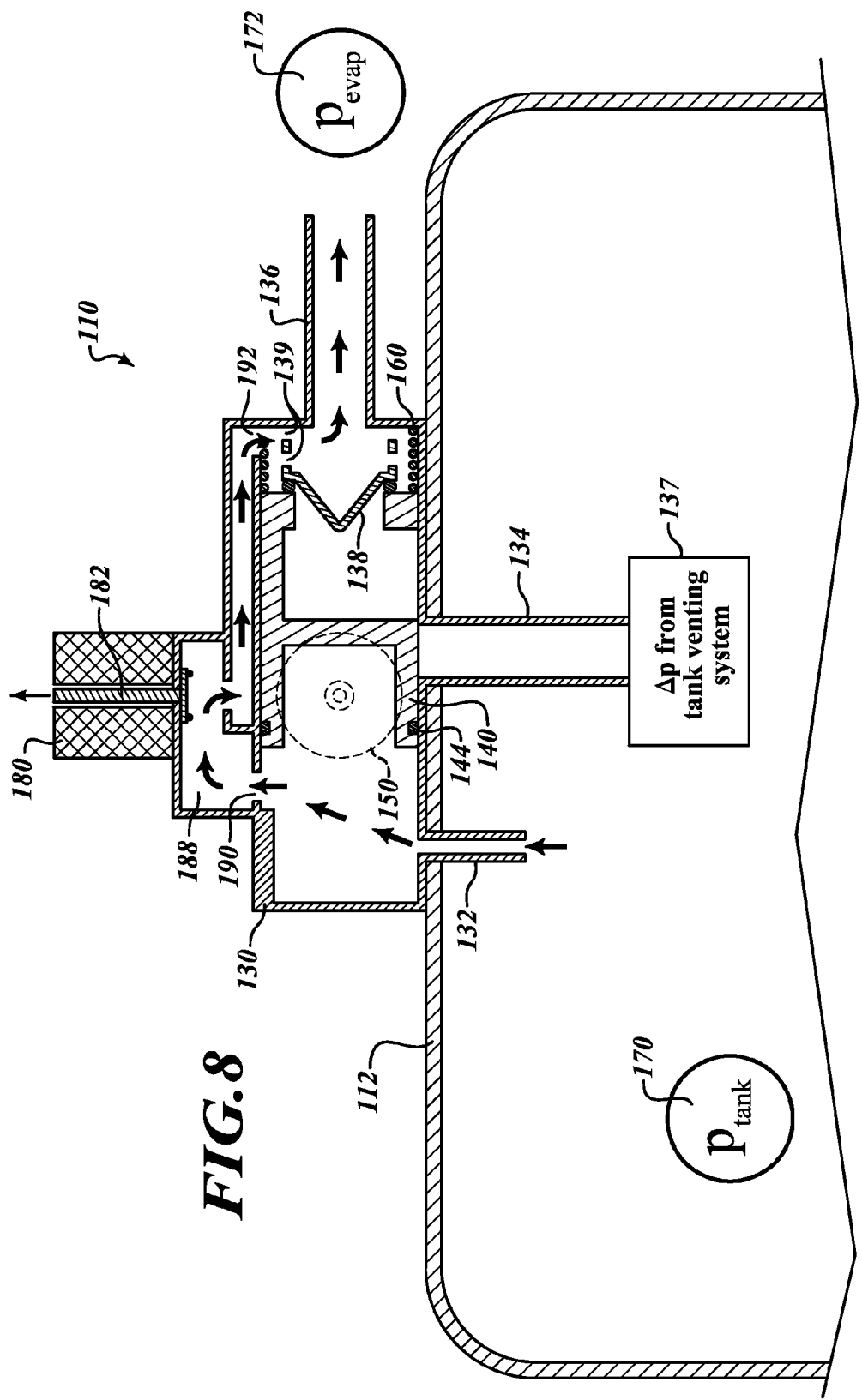
FIG. 8 is a cross-sectional view of the check valve of FIG. 7 and shown in a fifth condition with the valve mechanically closed (see FIG. 5) and with the second solenoid energized opening a bypass flow path.

Turning now to FIGS. 7 and 8 a fuel tank system constructed in accordance to another example of the present disclosure is shown and generally identified at reference 110. In general the fuel tank system 110 can have similar components as discussed above with respect to the fuel tank system 10 and are identified with reference numerals increased by 100.

A check valve 120 can generally include a valve body 130 that defines a first port 132, a second port 134 and a third port 136. The first port 132 fluidly connects the check valve 120 to the fuel tank 112. The second port 134 is fluidly connected to a fuel tank venting system 137. The third port 136 is fluidly connected to the filler neck, the canister and ultimately the FTIV (see filler neck 14, canister 22 and FTIV 24, FIG. 1). An internal baffle 138 can be configured in the valve body 130. The internal baffle 138 can define openings 139. In the example shown, the internal baffle 138 has a generally angled profile that urges flow toward an internal diameter of the valve body 130.

The check valve 120 has a shuttle or floating main valve 140 that is configured to slidably traverse within the valve body 130 in a direction left and right as viewed in FIG. 7. A first sealing member such as a first o-ring 144 is nestingly received in a groove defined on the floating main valve 140. A second sealing member such as a second o-ring 146 can be disposed on an end face of the floating main valve 140. The second o-ring 146 can be configured to selectively engage the baffle 138 when the check valve 120 is in the mechanically closed position (FIG. 7). The geometry of the floating main valve 140 is merely exemplary and other configurations are contemplated.

A first solenoid 150 can be disposed on the valve body 130. The first solenoid 150 can have a first pin 152 that actuates through a passage configured on the valve body 130 to engage a notch 156 on the floating main valve 140 as discussed above. The first pin 152 can actuate as a result of energizing coils within the solenoid 150. A biasing member 160 can be disposed in the valve body 130 and configured to bias the valve body 130 in a direction leftward as viewed in FIG. 7.

A second solenoid 180 can have a second pin 182 that has a damper 184 configured at a distal end. The second solenoid 180 is in a normally closed position (FIG. 7) where the damper 184 sealingly closes a passageway 186 defined in a bypass duct 188. The bypass duct 188 provides a flow path between a first opening 190 and a second opening 192 effectively creating a flow bypass between the first port 132 and the third port 136. When the damper 184 sealingly closes the passageway 186, flow is precluded from passing through the bypass duct 188 between the first and second ports 132 and 136.

Turning now to FIG. 8, when the check valve 120 is in the mechanically closed position (FIGS. 5 and 7), the second solenoid 180 can be energized thereby opening the bypass duct 188. With the bypass duct 188 open, flow is permitted between the first passage 190 and the second passage 192 effectively permitting flow between the first port 132 and the third port 136. This flow will pressurize the evaporative system pressure $p_{evap}$ 172 to the same pressure as the tank pressure $p_{tank}$ 170. Once the differential pressure is lower than the closing pressure, the floating main valve 140 will automatically slide from a closed position (FIG. 8), to an open position (FIG. 3). This movement is caused by the biasing member 160 overcoming the force caused by the differential pressure. While the configuration shown in FIGS. 7 and 8 incorporates two distinct solenoids, one or more solenoids may be incorporated for achieving similar results. For example, a single solenoid may be incorporated having multiple stages that allows a single pin to actuate to multiple positions satisfying the same function as described above with the operation of the first and second solenoids 150 and 180.

Figure 9:
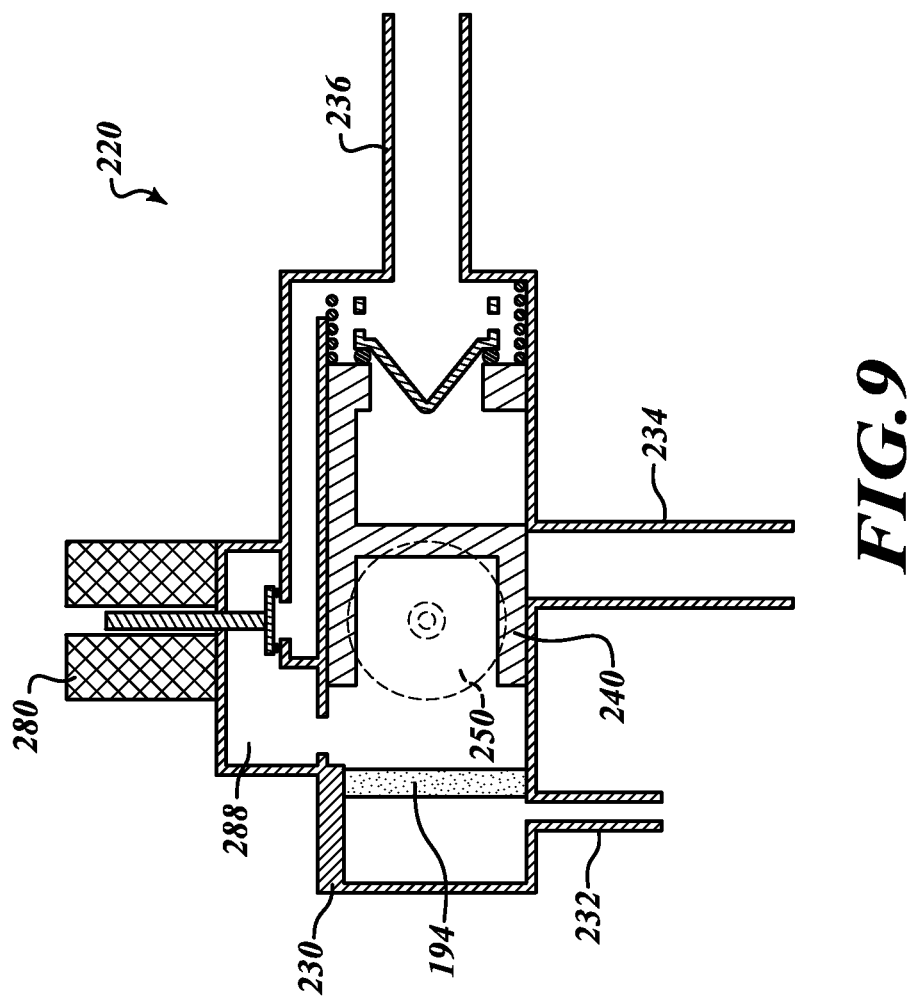
FIG. 9 is a cross-sectional view of a check valve constructed in accordance to additional features of the present disclosure and having a membrane configured to permit air and vapor to pass through while blocking liquid from passing through FIG. 10 is a schematic illustration of a three way check valve constructed in accordance to one example of the present disclosure and shown configured between a fuel tank, a canister and a filler neck.

With reference now to FIG. 9, a check valve 220 constructed in accordance to additional features will be described. In general the check valve 220 can have similar components as discussed above with respect to the check valve 120 and are identified with reference numerals increased by 100. In this regard, description of like components will not be repeated. The check valve 220 includes a membrane 194 that extends around the valve body 230 proximate to the first port 232. Instead of incorporating the first o-ring 144 (FIG. 7), the membrane 194 can be incorporated adjacent to the first port 232 isolating the first port 232 from a remainder of the valve body 230. The membrane 194 can allow air or vapor through, but inhibit liquid from passing therethrough. Therefore, the membrane 194 can protect the system from a liquid leak from the first port 232 and the third port 236.

Turning now to FIG. 10, a fuel tank system constructed in accordance to another example of the present disclosure is shown and generally identified at reference number 310. The fuel tank system 310 can generally include a fuel tank 312, a filler neck 314, a check valve 320, a canister 322 and a fuel tank isolation valve (FTIV) 324. A first vapor line 325 is connected between the fuel tank 312 and the check valve 320. A second vapor line 326 is connected between the check valve 320 and the filler neck 314. A third vapor line 327 is connected between the check valve 320 and the canister 322. A fourth vapor line 328 is connected between the check valve 320 and the FTIV 324.

With reference now to FIGS. 11 and 12, the check valve 320 will be described in greater detail. The check valve 320 can generally include a valve body 330 that defines a first port 332, a second port 334 and a third port 336. The first port 332 fluidly connects the check valve 320 to the fuel tank 312 by way of the first vapor line 325. The second port 334 is fluidly connected to the filler neck 314 by way of the second vapor line 326. The third port 336 is fluidly connected to the canister 322 by way of the third vapor line 327. An internal baffle 338 can be configured in the valve body 330. The internal baffle 338 can define openings 339. In the example shown, the internal baffle 338 has a generally angled profile that urges flow toward an internal diameter of the valve body 330.

The check valve 320 has a shuttle or floating main valve 340 that is configured to slidably traverse within the valve body 330 in a direction left and right as viewed in FIGS. 11 and 12. The geometry of the floating main valve 340 is merely exemplary and other configurations are contemplated. A first sealing member such as a first o-ring 344 can be positioned on one end of the floating main valve 340. A second sealing member such as a second o-ring 346 can be positioned on an opposite end of the floating main valve 340. The first sealing member 344 is configured to selectively engage the baffle 338 when the check valve 320 is in a mechanically closed position (FIG. 14). A flapper door check valve 348 can be provided on the floating main valve 340. The flapper door check valve 348 can be normally closed by gravity and/or a biasing member (not specifically shown). The second sealing member 346 is configured to selectively engage the flapper door check valve 348 in the normally closed position (FIG. 11). A biasing member 360 can be disposed in the valve body 330 and configured to bias the valve body 330 in a direction leftward as viewed in FIG. 11.

With reference now to FIG. 12, operation of the check valve 320 in a first condition will be described. In the first condition, the check valve 320 is in a refueling event. In the first condition during a refueling event, if the fuel tank 312 is pressurized and the canister 322 and/or the filler neck 314 is not pressurized or features a lower pressure, the airflow could go either to the filler neck 314 and/or will open the flapper door check valve 348 to get to the canister 322.

With reference now to FIG. 13, operation of the check valve 320 in a second condition will be described. In the second condition, the check valve 320 is in a tank depressurization event. If the fuel tank 312 is pressurized, the canister side of the flapper door check valve 348 is at a lower pressure and the filler neck side is blocked or closed, the air flow out of the fuel tank 312 will open the check valve 348 and flow to the canister 322. This function would be needed to depressurize the fuel tank 312 through the canister 322.

With reference now to FIG. 14, operation of the check valve 320 in a third condition will be described. In the third condition, the fuel tank 312 and the canister 322 are both pressurized and the filler neck 314 would be opened by malfunction or manual override. If the fuel tank 312 and the canister side of the check valve 348 are both pressurized and the filler neck side gets de-pressurized, the airflow coming from the canister 322 will urge the check valve 348 closed and apply a force (rightward as viewed in FIG. 14) onto the floating main valve 340 that will overcome the force of the biasing member 360 and urge the floating main valve 340 closed. Because the main valve 340 is closed, flow coming out of the fuel tank 312 cannot escape to the filler neck 314 and therefore the fuel tank 312 does not depressurize.

With reference now to FIG. 15, the check valve 320 is again shown in the third condition. In this example, no pressure or flow is coming from the canister 322. The floating main valve 340 stays open. In FIG. 16, pressure or flow is coming from the canister 322. The floating main valve 340 closes and tank pressure cannot escape.

Turning now to FIGS. 17-19, a check valve 420 constructed in accordance to additional features will be described. The check valve 420 includes a main valve body 430 that defines a first port 432 and a second port 434. The first port 432 fluidly connects the check valve 420 to the fuel tank (see fuel tank 312, FIG. 10 for example). The second port 434 fluidly connects the check valve 420 to the canister (see canister 322, FIG. 10 for example). The check valve 420 further includes a ball check valve 440, a main seal 442 and a solenoid assembly 444. The solenoid assembly 444 can include a solenoid coil 446, an armature 448 and a biasing member 450. In the example shown, the ball check valve 440 is integrated into the main seal 442. In other examples, the ball check valve 440 can be a discrete component from the main seal 442.

FIG. 17 illustrates the check valve 420 in a tank venting condition. The solenoid coil 446 is de-energized. Flow goes from the first port 432, through the ball check valve 440 and out the second port 434. In tank venting, relatively low flow and low pressure exists. In the tank venting condition shown in FIG. 17, a sealing member such as an o-ring 458 configured on the check ball valve body 460 is seated with the main valve body 430. The main seal 442 therefore is sealed against the main valve body 430, by way of the sealing member 458, inhibiting flow around the ball check valve 440 in the tank venting position.

FIG. 18 illustrates the check valve 420 in a sealed condition. The solenoid coil 446 is de-energized. The main seal 442 therefore is sealed against the main valve body 430, by way of the sealing member 458, inhibiting flow around the ball check valve 440 in the sealed position. A check ball 464 of the ball check valve 440 is forced onto a seat 466 by a flow/tank-side pressure. No flow therefore is permitted through the ball check valve 440 in the sealed position. No flow from the fuel tank to the canister is permitted. High pressure exists on the fuel tank side.

FIG. 19 illustrates the check valve 420 in a refueling condition. The solenoid coil 446 is energized causing the ball check valve 440 to move rightward in FIG. 19 and off of the sealing member 458. Flow goes from the first inlet 432 through and around the ball check valve 440. Additionally, flow is permitted through the ball check valve in the refueling position. High flow, low pressure exists in the refueling condition.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve configured for use in a fuel tank system having a fuel tank and a canister, the valve comprising:
    a check valve having a main valve body that defines a first port and a second port, the first port being fluidly connected to the fuel tank and the second port being fluidly connected to the canister, the check valve selectively operating in each of (i) a tank venting condition, (ii) a sealed condition and (iii) a refueling condition;
    a ball check valve movably disposed in the main valve body, the ball check valve having a check ball valve body and a check ball, wherein the check ball moves between a seated position that inhibits flow through the ball check valve and an unseated position that permits flow through the check ball valve body; and
    a solenoid assembly that moves between (i) an energized position that moves the check ball valve body off the main valve body permitting flow from the fuel tank to the canister in the refueling condition and (ii) a de-energized position that permits the check ball valve body to form a seal with the main valve body to inhibit flow around the check ball valve body to the second port in both of the tank venting condition and the sealed condition.

2. The valve of claim 1 wherein in the tank venting condition, the check ball moves to the unseated position permitting flow though the check ball valve body.

3. The valve of claim 2 wherein the check valve further comprises a biasing member that biases the check ball valve body toward the main valve body to form the seal with the main valve body to inhibit flow around the check ball valve body to the second port.

4. The valve of claim 1, further comprising a sealing member configured on the check ball valve body that selectively seats with the main valve body in the tank venting condition inhibiting flow around the ball check valve.

5. The valve of claim 4 wherein the sealing member on the check ball valve body seats with the main valve body in the sealing condition inhibiting flow around the ball check valve.

6. The valve of claim 4 wherein the sealing member moves off of the main valve body in the refueling condition whereby flow it permitted to flow from the first inlet around the ball check valve.

7. The valve of claim 1 wherein the ball check valve comprises an integrally formed main seal.

8. A valve configured for use in a fuel tank system having a fuel tank and a canister, the valve comprising:
   a check valve having a main valve body that defines a first port and a second port, the first port being fluidly connected to the fuel tank and the second port being fluidly connected to the canister, the check valve selectively operating in both of (i) a tank venting condition and (ii) a sealed condition;
   a ball check valve movably disposed in the main valve body, the ball check valve having a check ball valve body and a check ball, wherein the check ball moves between a seated position that inhibits flow through the ball check valve and an unseated position that permits flow through the check ball valve body; and
   a solenoid assembly that moves between (i) an energized position that moves the check ball valve body off the main valve body permitting flow from the fuel tank to the canister in a refueling condition and (ii) a de-energized position that permits the check ball valve body to form a seal with the main valve body to inhibit flow around the check ball valve body to the second port in both of the tank venting condition and the sealed condition.

9. The valve of claim 8 wherein in the tank venting condition, the check ball moves to the unseated position permitting flow though the check ball valve body.

10. The valve of claim 9 wherein the check valve further comprises a biasing member that biases the check ball valve body toward the main valve body to form the seal with the main valve body to inhibit flow around the check ball valve body to the second port.

11. The valve of claim 8, further comprising a sealing member configured on the check ball valve body that selectively seats with the main valve body in the tank venting condition inhibiting flow around the ball check valve.

12. The valve of claim 11 wherein the sealing member on the check ball valve body seats with the main valve body in the sealing condition inhibiting flow around the ball check valve.

13. The valve of claim 11 wherein the sealing member moves off of the main valve body in the refueling condition whereby flow it permitted to flow from the first inlet around the ball check valve.

14. The valve of claim 8 wherein the ball check valve comprises an integrally formed main seal.

* * * * *